United States Patent [19]
Grau et al.

[11] Patent Number: 5,097,123
[45] Date of Patent: * Mar. 17, 1992

[54] BROAD ENERGY SPECTRA NEUTRON SOURCE FOR LOGGING AND METHOD

[75] Inventors: James A. Grau; Bradley A. Roscoe, both of Ridgefield, Conn.

[73] Assignee: Schlumberger Technology Corporation, New York, N.Y.

[*] Notice: The portion of the term of this patent subsequent to Jun. 4, 2008 has been disclaimed.

[21] Appl. No.: 683,402

[22] Filed: Apr. 10, 1991

Related U.S. Application Data

[63] Continuation-in-part of Ser. No. 476,223, Feb. 7, 1990, Pat. No. 5,021,653.

[51] Int. Cl.$^5$ ............................................. G61V 5/10
[52] U.S. Cl. .................................. 250/270; 250/261; 250/265
[58] Field of Search ............... 250/270, 265, 269, 266, 250/268, 256, 390.01, 390.04

[56] References Cited

U.S. PATENT DOCUMENTS

| | | | |
|---|---|---|---|
| 3,521,064 | 7/1970 | Moran et al. | 250/261 |
| 3,665,195 | 5/1972 | Youmans | 250/270 |
| 3,976,878 | 8/1976 | Chevalier et al. | 250/253 |
| 4,055,763 | 10/1977 | Antkiw | 250/270 |
| 4,283,624 | 8/1981 | Mills, Jr. | 250/264 |
| 4,317,993 | 3/1982 | Hertzog, Jr. et al. | 250/220 |
| 4,327,290 | 4/1982 | Plasek | 250/262 |
| 4,387,302 | 6/1985 | Givens | 250/270 |
| 4,464,569 | 8/1984 | Flaum | 250/270 |
| 4,506,156 | 3/1985 | Mougne | 250/269 |
| 4,605,854 | 8/1986 | Smith, Jr. | 250/266 |
| 4,810,876 | 3/1989 | Wraight et al. | 250/270 |
| 5,021,653 | 6/1991 | Roscoe et al. | 250/270 |

OTHER PUBLICATIONS

"Aluminum Activation Log", H. D. Scott and M. P. Smith, SPWLA 14th Annual Logging Symposium, Lafayette, Louisiana, May 6-9, 1973.

"Geochemical Logging with Spectrometer Tools", R. Hertzog et al., 62nd Annual Technical Conference and Exhibition of the SPE, Dallas, Tex., Sep. 27-30, 1987, paper SPE #16792.

*Modern Physics for Engineers*, O. Oldenberg and N. C. Rasmusseen, pp. 419-420.

*CRC Handbook of Fast Neutron Generators*, vol. I, J. Csikai, CRC Press, Inc., Boca Raton, Fla., pp. 13-19, 83, 84.

*Chemical Analysis*, A series of monographs on analytical chemistry and its application, Wiley-Interscience Publication, vol. 39, pp. 18-23, "Activation Analysis with Generators", S. S. Nargowalla and E. P. Przybylowicz.

*Primary Examiner*—Carolyn E. Fields
*Assistant Examiner*—Drew A. Dunn
*Attorney, Agent, or Firm*—Leonard W. Pojunas; Frederic Wagret

[57] ABSTRACT

Logging method and tool string for identifying and determining the concentrations of subsurface formation elements next to a borehole, by (i) using a broad energy spectra neutron source (such as a chemical source, like AmBe), and (ii) detecting and counting the delayed gamma rays resulting from the activation by the neutrons of atoms of least one element of interest (e.g. aluminum). Two gamma ray detectors may also be disposed on either side of the broad energy spectra neutron source, for detecting and counting the prompt gamma rays resulting from the capture of neutrons by atoms of elements, such as Si, Ca, Fe, S, H, or Cl, Gd, Ti, or K.

The broad energy spectra neutron source is used for both the "activation" and the "capture" measurements. The tool string may also include a natural gamma ray tool for the determination of uranium, thorium and potassium, and for measuring the background to be subtracted from the gross Al activation measurement.

14 Claims, 4 Drawing Sheets

BROAD ENERGY SPECTRA NEUTRON SOURCE FOR LOGGING AND METHOD

This application is a continuation-in-part of patent application Ser. No. 476,233, filed on Feb. 7, 1990 for "Geochemical Logging Apparatus and Method for Determining Concentrations of Formation Elements Next to a Borehole", now U.S. Pat. No. 5,021,653.

BACKGROUND OF THE INVENTION

1. Field of the Invention

This invention relates to investigating earth formations traversed by a borehole. More particularly, the present invention is directed to an apparatus and a method for determining element concentration values and for further characterizing the attributes of the formations surrounding a borehole.

2. Related Application

The present application is related to the copending Assignee's patent application filed Dec. 13, 1989, Ser. No. 07/450,355, in the name of Don McKeon et al., for a "Logging Apparatus and Method for Determining Concentrations of Subsurface Formation Elements", wherein the apparatus comprises a single neutron source in the form of an electronic high energy neutron source.

3. The Related Art

The capital cost of drilling and evaluating a deep well, for example an oil or natural gas well, is extremely high, and for this reason considerable expense is incurred during those time intervals when drilling or production steps must be interrupted to evaluate the formation. With known analysis techniques, the concentration of some elements might be derivable from logging of the formation, but the concentrations of other elements would require the taking of core samples for analysis.

The existence and quantity of an element in a formation can be determined, as described in U.S. Pat. No. 3,665,195, by irradiating the formation with neutrons and detecting the induced gamma ray activity from the elements of interest. After determining the thermal neutron capture cross section of the formation, the product of the gamma ray emission and the thermal neutron capture cross section is obtained as a quantitative indication of the element's abundance in the formation.

Here after is given a simplified view of the thermal neutron capture process. Neutrons are created and propagate into the formation. Some of the neutrons are absorbed, but the majority slow down until they reach thermal energies. At thermal energies, the neutrons diffuse until they are captured by one of the nuclei of the formation. For a particular neutron, its capture will depend on the number of nuclei it "sees", weighted by the microscopic capture cross section (probability) of each nucleus (the total in a homogeneous formation is proportional to the formation capture cross section $SIGMA_{form}$). Thus, the greater the number of nuclei of a particular element, the greater the number of neutrons that will be captured by that element. In other words, the number of capture gamma rays produced is, for a particular element, proportional to the number of nuclei per volume unit. Once the neutrons are captured, they will produce a spectrum of prompt capture gamma rays specific for each element. These gamma rays are transported to the detector, some are degraded in energy, and others are lost. Those that are detected by the detector are used for the spectral measurement. This detected spectrum is decomposed to obtain the fractional contributions or yields, $Y_i$, of each element in the total spectrum. Relative values for two $Y_i$ will be proportional to the relative atomic abundance of the elements in the formation (with the ratio weighted by many nuclear parameters: gamma-ray multiplicity, gamma-ray transmission probabilities, neutron capture cross sections, etc). Once good relative yield measurements are provided, it is only necessary to determine the proper absolute normalization to transform these relative measurements into elemental concentrations.

In the article "The Aluminum Activation Log" by H. D. Scott and M. P. Smith, presented at the SPWLA Fourteenth Annual Logging Symposium, Lafayette, La., May 6-9, 1973, there is described a method for measuring the aluminum content of the formation, in order to estimate the formation shale fraction. A californium-252 source of neutrons is used in conjunction with a measurement of the formation thermal neutron capture cross section to produce a continuous activation log of a borehole.

In the neutron activation process, an atomic nucleus absorbs a neutron, creating an unstable isotope which decays, after some delay, usually by beta decay, with associated gamma rays of characteristic energies. In aluminum activation, the natural isotope 27Al absorbs thermal neutrons and produces the unstable isotope 28Al, which beta decays with a half-life of 2.24 minutes, emitting a 1779 keV gamma ray. This sequence is summarized below:

Aluminum:

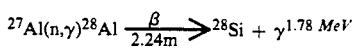

As a general definition, here "capture" refers to the prompt emission of gamma rays, while "activation" here refers to the delayed emission of gamma rays.

U.S. Pat. No. 4,464,569 discloses a method for determining basic formation component volume fractions, including a spectroscopic analysis of capture gamma ray spectra obtained from a neutron spectroscope logging tool. The relative sensitivities of the logging tool to the specific minerals or to the chemical elements in the formation are determined either from core analysis or from tests run in known formations. The spectroscopic elemental yields and the relative sensitivities are then used together to determine the volume fractions of the basic formation components such as limestone, sandstone, porosity, salinity, dolomite, anhydrite, etc.

Nevertheless, the method described in the '569 patent does not require, and the patent does not disclose, a straight forward way for determining elemental concentrations, especially through the use of commonly available logging tools or modifications thereof. This known method takes appropriate combinations of measured yields, normalizes core data or laboratory measurements to obtain calibrated relative sensitivities and makes use of the constraint that the sum of all volume fractions is unity. Values of the volume fractions can then be found by solving the appropriate set of equations for the formation component volume fractions.

U.S. Pat. No. 4,810,876 contemplates a logging apparatus and processing methods for determining elemental concentrations, in order to assess the mineralogy of a formation, based on an indirect approach that in part relies upon certain unique assumptions.

The article entitled "Geochemical Logging with Spectrometry Tools" by R. Hertzog et al., presented at the 62nd Annual Technical Conference and Exhibition of the SPE, held in Dallas, Tex. on Sept. 27-30, 1987, paper SPE #19792, discloses a Geochemical Logging Tool, known as the GLT tool (mark of Schlumberger Technology Corporation), designed to measure natural, activation, and neutron capture gamma rays. The GLT tool produces logs of the most abundant elements and direct measurements of Al concentrations are provided. The GLT tool comprises a tool string including successively from top to bottom: (i) a natural gamma ray tool, known as the NGS tool (mark of Schlumberger Technology Corporation) and depicted in U.S. Pat. No. 3,976,878; (ii) a source of low energy neutrons, preferably Californium-252; (iii) an activation tool, known as AACT tool, adapted for measuring the delayed gamma rays resulting from the activation of aluminum atoms by the neutrons emitted by the californium source; and (iv) a gamma spectrometer tool, known as the GST tool (mark of Schlumberger Technology Corp.) and being such as depicted in U.S. Pat. Nos. 4,317,993 or 4,327,290; the GST tool is designed to detect prompt gamma rays resulting from the capture of neutrons emitted by another source, i.e. a high energy (14 Mev) neutron generator provided in the string. The whole GLT tool involves three separate modes of gamma-ray spectroscopy to make a comprehensive elemental analysis of the formation. The first measurement is performed by the NGS tool which passes by the formation before any neutron source can induce radioactivity in order to derive the concentrations of K, Th, and U in the formation. The second measurement is performed by the AACT tool; the AACT tool, the NGS tool above it, and the 252Cf neutron source between them, allow a measurement of activation gamma rays to be used to derive formation aluminum concentration. The third measurement is performed by the GST tool to derive a spectrum of capture gamma rays from a plurality of elements in the formation, such as Si, Ca, Fe, S, Ti, K, and Gd. The GST tool uses a high energy (14 Mev) pulsed neutron generator to induce these capture reactions.

Although the above mentioned known GLT tool affects significant advantages over earlier tools, it is desirable to provide still further improvements.

Due to the relatively large number of devices composing the GLT string, the GLT turns out to be critically long. This drawback, detrimental by itself, also indirectly prevents any improvements of the measurements by adding detectors and/or electronic data processing devices.

Moreover, the logging speed is relatively slow due to the fact that the "capture" measurements cannot be continuously carried out, but only during the time the pulsed neutron generator is off. Furthermore, the measurements of capture gamma rays are carried out in a time window, after the source has been turned off, when the counts have already drastically decreased; this substantially reduces the precision of the measurements.

Additionally, the presence of the high energy neutron generator complicates placing, at the bottom of the string, an additional tool designed to carry out density measurements, because of the interference which might occur between the gamma rays emitted by the density tool and the gamma rays resulting from the fast neutron reaction of the atoms of interest ($S_i$ and $O_2$) of earth formations.

Finally, since two different sources, i.e. the radioactive californium source and the high energy neutron generator, are respectively used for the aluminum activation measurements and the "capture" measurements, an environmental correction for aluminum is required. Such correction, needed for taking into account the porosity and the absorption properties of the formation and of the borehole, is not fully satisfactory due to its relatively empiric nature.

According to the above, there is a need for a logging tool for measuring natural, activation and neutron capture gamma rays, which do not show the drawbacks hereabove mentioned.

SUMMARY OF THE INVENTION

It is a first object of the invention to provide a logging tool for measuring natural, "activation" and neutron "capture" gamma rays, easy to use and having a reasonable length.

It is a second object of the invention to propose a logging tool with reduced total error (or statistics) on the measurements.

It is a third object of the invention to propose a logging tool having increased count rates of gamma rays resulting from thermal neutron capture.

It is a fourth object of the invention to propose a logging tool able to make, in one run in the borehole, radioactivity, "activation", "capture" and "porosity" measurements, plus optionally to combine with these three measurements a "density" measurement.

A fifth object of the invention is to reduce the errors in the interpretation of aluminum content, by proposing a new interpretation model.

These and further objects are attained according to the invention by a method for identifying and determining the concentrations of subsurface formation elements next to a borehole, including the steps of:

(1) irradiating the formations with neutrons from a broad energy spectra neutron source disposed in a logging tool lowered in the borehole;

(2) detecting and counting the delayed gamma rays resulting from the activation by the neutrons of atoms of at least a first element;

(3) deducing from the counts of gamma rays the concentration of said first element;

(4) detecting and counting the prompt gamma rays resulting from the capture of said neutrons by atoms of at least a second element; and (5) deducing from the count rates of capture gamma rays the concentration of said second element.

Preferably, the energy of said neutrons is such that the activation of atoms of an element which might interfere with said first element, is minimized.

In a preferred embodiment, the neutron source is a chemical source, such as an AmBe source. Particularly, the first element is aluminum and the interfering element is silicon.

The method further includes detecting and counting the prompt gamma rays resulting from the capture of the neutrons by atoms of a first plurality of elements, and deducing from the respective count rates of capture gamma rays relative to each element, the concentration of each element.

The first plurality of elements comprises Si, Ca, Fe, S, H, Cl, Gd, Ti, or K, or any combination thereof.

The method includes preventing thermal neutrons to interact with the material constituting the logging tool itself.

The method also includes the steps of detecting and counting the gamma rays resulting from the background natural activity, and subtracting said count rates from the count rates of the activation of atoms of said first element.

The method may also include detecting and counting the gamma rays resulting from the natural activity of atoms of a second plurality of elements, such as uranium, thorium, potassium.

The method may further comprise detecting and counting the thermal (or epithermal) neutrons resulting from the interaction of the emitted neutrons with hydrogen atoms of the formation (for porosity measurements).

The invention also contemplates a logging tool for identifying and determining the concentrations of subsurface formation elements next to a borehole, including a housing comprising:

(1) means for irradiating the formations with neutrons from a broad spectra neutron source disposed in a logging tool lowered in the borehole;

(2) means for detecting and means for counting the delayed gamma rays resulting from the activation by the neutrons of atoms of at least a first element;

(3) means for deducing from the counts of gamma rays the concentration of said first element;

(4) means for detecting and means for counting the prompt gamma rays resulting from the capture of neutrons by atoms of at least a second element; and (5) means for deducing from the count rates of capture gamma rays the concentration of said second element.

In a preferred embodiment, the neutron source is a chemical source, such as an AmBe source.

The logging tool may also include means for detecting and means for counting the prompt gamma rays resulting from the capture of neutrons by atoms of a first plurality of elements, and means for deducing from the respective count rates of capture gamma rays relative to each element, the concentration of each element.

The logging tool may also include means for detecting and means for counting the gamma rays resulting from the background natural activity, and means for subtracting said count rates from the count rates of the activation of atoms of said first element.

The tool may also include means for detecting and means for counting the gamma rays resulting from the natural activity of atoms of a second plurality of elements.

The logging tool includes a boron shield surrounding said means for detecting the prompt gamma rays resulting from the capture of neutrons.

In a preferred embodiment, the logging tool comprises successively, from top to bottom:

(1) means for detecting and means for counting the gamma rays resulting from the natural activity of atoms of at least one element (such as uranium, thorium, or potassium);

(2) first means for detecting and means for counting the prompt gamma rays resulting from the capture of neutrons by atoms of at least another element (such as Si, Ca, Fe, S, H, Cl, Gd, Ti, or K, or any combination thereof);

(3) means for irradiating the formations with neutrons, in the form of a broad energy spectra neutron source;

(4) second means for detecting and means for counting the prompt gamma rays resulting from the capture of neutrons by atoms of said another element; and (5) means for detecting and means for counting the delayed gamma rays resulting from the activation by the neutrons of atoms of at least a further element (such as Al).

The tool may further include means for detecting and counting the thermal (or epithermal) neutrons resulting from the interaction of the emitted neutrons with hydrogen atoms of the formation (for porosity measurements).

The invention refers also to a logging tool for identifying and determining the concentrations of subsurface formation elements next to a borehole, including a housing comprising:

(1) means for irradiating the formations with neutrons, in the form of a broad energy spectra neutron source;

(2) means for detecting and means for counting the delayed gamma rays resulting from the activation by the neutrons of atoms of at least a first element; and (3) means for deducing from the counts of gamma rays the concentration of said first element.

The neutron source may be e.g. a PuBe source.

The characteristics and advantages of the invention will appear better from the description to follow, given by way of a nonlimiting example, with reference to the appended drawing in which:

DESCRIPTION OF THE PREFERRED EMBODIMENT

Figure 1:
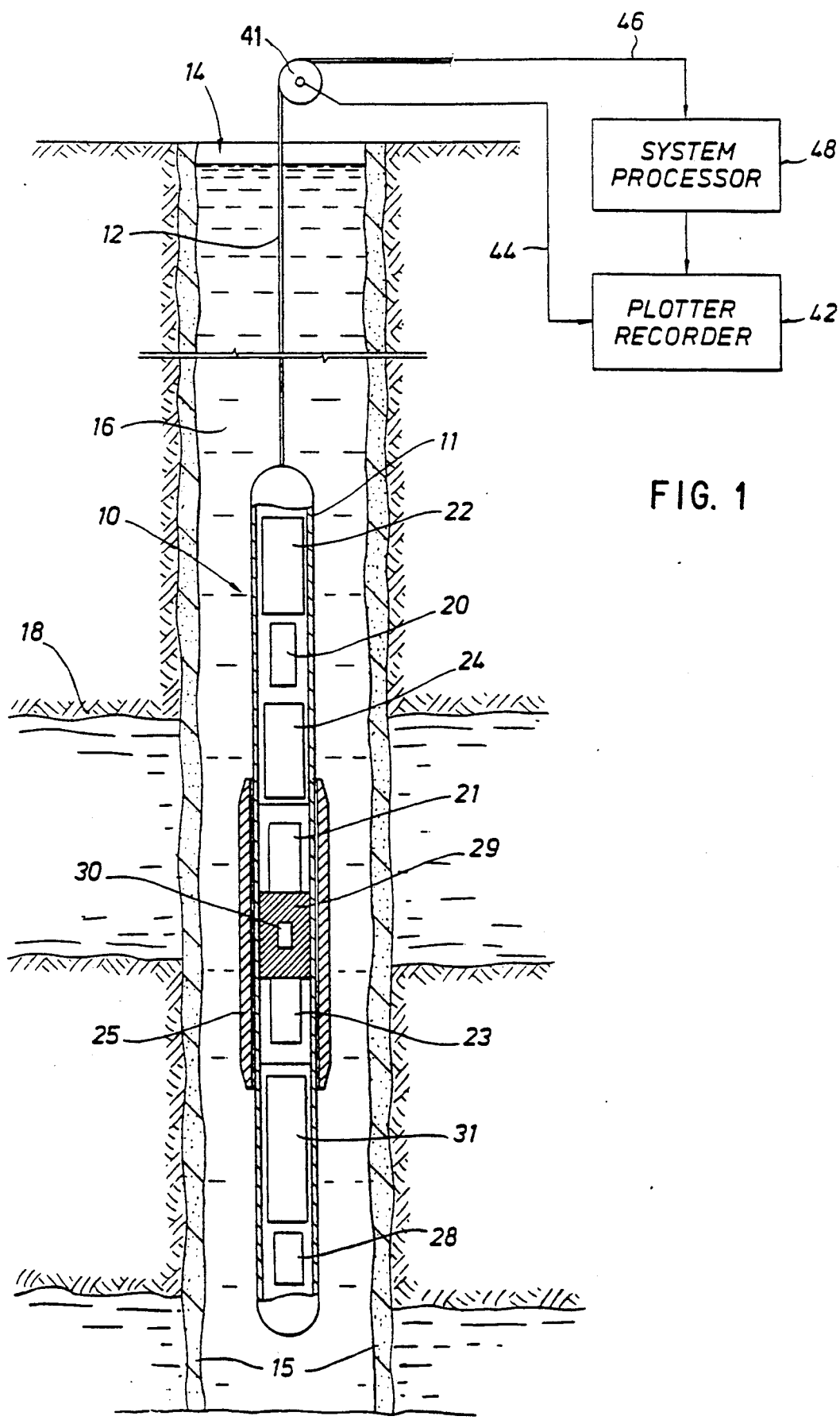
FIG. 1 is a schematic side view of an embodiment of the invention in the form of a logging tool suspended in a well.

An illustrative embodiment of the apparatus embodying the overall method of the present invention is shown in FIG. 1 in the form of a logging tool string 10 suspended by an armored cable 12 in the borehole 14. The borehole is typically filled with drilling mud 16 and is surrounded by earth formations 18. During drilling, the drilling mud deposits a solid layer of material on the borehole wall in the form of a mud cake 15.

The tool string 10 comprises an elongated housing 11 including, at the top, a communication cartridge 22 and a plurality of tool systems, more fully described below, and designed to acquire data for the determination of the absolute or relative concentrations of a plurality of elements, the results of which are used in an overall method for determining the concentrations of substantially all significant elements within the formations 18.

It should be understood that reference herein to tool, detectors, tool systems, and the like are not to be construed as defining limitations on whether a particular function associated with a tool is to be performed by a single device or a plurality of devices, or whether such devices are contained within a single tool, or a plurality of tools drawn through the borehole 14 in tandem. For convenience, the term "tool system" as used herein, shall refer to one or more individual devices that acquire and process data from the formation or borehole for use in determining a specific property or quantity of interest. Also, reference to patents or other publications in the following description should be understood to incorporate the material thereof into the present specification.

While the tool string 10 is moved through the borehole 14, an indication of its depth in the borehole is provided by a depth determining apparatus, generally indicated at 41, which is responsive to the movement of the cable 12, as it is let out and reeled in by a winch (not shown). The depth determining apparatus 41 is connected to a plotter/recorder 42 by a conventional, well-known cable-following device 44.

The data gathered by the different tool systems in the string 10 are initially processed in the communication cartridge 22 and transmitted through the cable 12, by means of communication line 46, into the system processor 48. The system processor 48 is typically located above ground, and operates in real time. The function of the system processor 48 is to determine the elemental concentration in the formation and store the values. A plot or recording of the elemental concentrations at various depths within the borehole can be made at 42.

The tool string 10 includes three tool systems successively arranged along the string 10 and which will be hereafter described, from top to bottom.

Below the communication cartridge 22 is provided the first tool system which includes, in the preferred embodiment, a tool for measuring the natural gamma radiation of a plurality of elements, such as potassium, uranium and thorium. For convenience, this tool will be referred to as NGS. The NGS tool includes a gamma ray detector 20 and is more fully described in U.S. Pat. No. 3,976,878 which is hereby incorporated by reference. The NGS detector 20 might be of the sodium iodide type or preferably of the BGO type, and includes associated photomultiplier tubes and electronic circuitry, as known in the art, for measuring the number and energy distribution of the natural gamma rays incident upon the detector 20. The NGS tool typically includes circuitry, such as a spectrometer, which defines several energy "windows" in which counts may be accumulated and which are typically used for determining the naturally occurring concentrations of potassium (K), uranium (U) and thorium (Th). By way of example, if as few as five windows are used, the first energy window spans an energy range from 0.15 to 0.5 MeV, a second window from 0.5 to 1.1 MeV, a third window from 1.1 to 1.6 MeV, a fourth window from 1.6 to 2 MeV, and a fifth window from 2 to 3 MeV.

Below the NGS tool is provided an electronic cartridge 24 designed to acquire or otherwise process data coming from the different tool systems of the whole tool string 10.

Below the electronic cartridge 24 is disposed a second tool system which is designed to determine the relative elemental yields of elements of interest in the earth formations by irradiating the formation with neutrons and measuring yields of the prompt gamma rays resulting from capture of neutrons by the atoms corresponding to these elements. For convenience, this second tool system will be referred to as the Gamma Spectroscopy Tool or as the GST tool. The GST tool comprises, according to the invention, a first detector 21, a second detector 23 and a broad energy spectra neutron source 30 disposed between said detectors 21 and 23. Details on the general implementation of the GST tool can be found in U.S. Pat. Nos. 3,521,064, 4,055,763, 4,317,993, or 4,810,876, which are hereby incorporated by reference. The broad energy spectra neutron source 30 is, in a preferred embodiment, made of a chemical source such as an AmBe source. Alternately, the source 30 can be made of a broad energy spectra neutron source, such as a PuBe source. The energy of the neutrons emitted by the broad energy spectra source is in a broad range of 2 to 10 Mev. The kind of broad energy spectra source to be used can activate an element which might interfere with Al activation, such as silicon. A silicon reaction occurs above 3.9 Mev. There are instances where the bombardment by neutrons of two distinct elements produces two isotopes having substantially the same half-lives. In some cases, the same radioisotope is produced from two different elements. For example, both $^{27}$Al and $^{28}$Si react with neutrons and produce $^{28}$Al which has a half-life of about 2.3 minutes. It is apparent that the determination of the amount of silicon and aluminum in a formation by bombarding the formation with neutrons is thus rendered difficult because the gamma-ray activity resulting when the $^{28}$Al atoms revert to their stable condition could not be separated into the components that are respectively due to aluminum and silicon. Hereafter are summarized the respective Al and Si activation processes:

Aluminum:

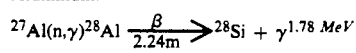

Silicon (n,p):

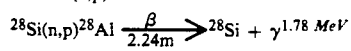

To compensate, the weight fraction of silicon is detected using prompt capture gamma ray techniques.

The outside wall of the housing 11, facing the capture first detector 21 and the capture second detector 23, is surrounded by a cylindrical sleeve 25, made of a material, such as boron, which acts as a neutron absorber, and thus prevents thermal neutrons from activating, through capture or activation phenomenon, atoms in the housing 11 (mainly Fe) which would emit gamma rays able to interfere with gamma rays resulting from the capture of earth formation elements of interest. The neutron source 30 is placed in a shield 29 made of a high density material, such as the material known under the mark Hevimet. In another embodiment, the shield 29 comprises a combination of a high density material, for absorbing gamma rays and of a light material, such as hydrogen or beryllium, acting as a neutron moderator.

The tool string 10 includes a third tool system which is designed to determine the absolute aluminum concentration, and will be hereafter referred to as the AACT. The AACT tool includes the broad energy spectra source 30 (already referred to in connection to the GST tool), and an AACT detector 28, of the sodium iodide type or preferably of the BGO type, including associated photomultiplier tubes and electronic circuitry (such as a spectrometer), as known in the art, for measuring the number and energy distribution of the delayed gamma rays incident upon the detector 28. The AACT detector 28 and its associated devices is similar to the NGS detector 20. The AACT detector 28 is placed at the bottom end of the housing 11. A chamber 31, between the broad energy spectra neutron source 30 and the AACT detector 28, contains the power supplies and controls (known per se).

Unlike the tools of the prior art, the tool string 10 of the invention uses a single neutron source common to both the AACT and the GST tool systems, to wit the broad energy spectra neutron source 30.

The AACT tool is utilized in conjunction with the broad energy spectra neutron source 30 to obtain activated aluminum count rates. The emitted neutrons slow down within the formation and are captured by the aluminum atoms, which in turn emit a delayed gamma ray at 1779 kev.

The logging tool string 10 according to the invention is hereafter described in one of its operative modes.

After the tool string 10 has been lowered to the bottom of the borehole 14, or to any depth below the zone to investigate, the string is then raised at a given speed while acquiring data resulting from the interaction of the neutrons emitted by the neutron source 30 with atoms of the earth formations 18.

The NGS tool measures the natural gamma radiation of potassium, uranium and thorium, as known in the art. The NGS tool also provides a natural background activity count rate measurement for correcting the aluminum measurement of the AACT. By methods well known in the art, if the NGS detector measures the background count rate due to naturally radioactive elements and the AACT detector 28 measures the total activity resulting from the activation by the source 30 of these elements and aluminum, then the background can be subtracted to provide a measured aluminum count rate.

The neutron source 30 emits broad energy spectra neutrons which interact with the atoms of the different elements in the earth formations. Schematically, three types of interaction may occur. The first type of interaction is an inelastic collision leading to the emission of a photon. The second type of interaction is the activation of an atom which results in the delayed emission of a gamma ray, the energy of which is characteristic of said atom. The third type of interaction, usually called "capture", occurs when the neutrons lose their energy down to thermal energies and are absorbed by atoms; the capture process results in the prompt emission of one or more gamma ray(s).

The GST tool, through the use of the first and second detectors 21 and 23, detects prompt gamma rays resulting from the capture of the neutron by atoms of a plurality of elements of interest in the earth formations. Such elements include Si, Ca, Fe, S, H, Cl, Gd, Ti or K, or any combination thereof. The first detector 21 and second detector 23 are relatively large so as to enhance the number of counts. The AACT detector 28 detects the delayed gamma rays resulting from the activation of aluminum.

Figure 2:
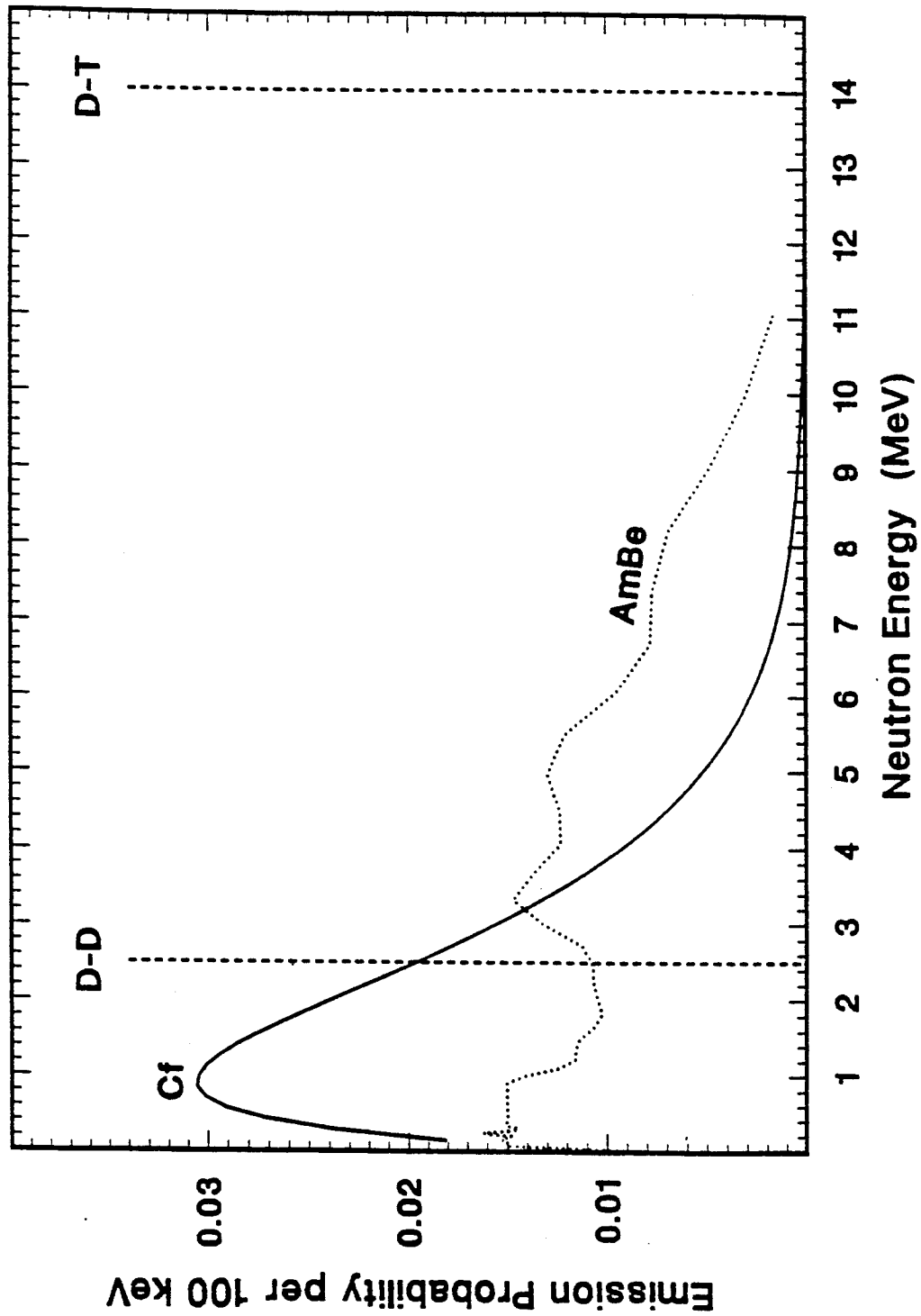
FIGS. 2 and 3 illustrate neutron source output spectra for various neutron sources.

FIG. 2 illustrates neutron source output spectra for four neutron sources. FIG. 2 charts Emission Probability per 100 keV as a function of Neutron energy in MeV. The entire range of emission probability of electronic neutron sources deuterium-deuterium (D-D) and deuterium-tritium (D-T) occurs only in a narrow band around 2.5 MeV and 14 MeV, respectively. A major portion of the emission probability of Californium (Cf) occurs between 2 and 4 MeV. The use of Cf as a neutron source is discussed in U.S. Pat. No. 5,021,653, referenced above.

The inventors have found, however, that neutron sources having a broad spectra of energy can be used. Such a broad energy spectra source typically covers a range of 0 to 10 MeV, approximately, and has no more than 10% of its spectra above 10 MeV. FIG. 2 illustrates one example of such a broad energy spectra source. Americum-Beryllium (AmBe), exhibits an emission probability between 0.006 and 0.015 over a wide range of spectra, including 2 to 10 MeV. The curve shown for AmBe is substantially representative of any AmBe source. However, the curve can vary slightly depending on how the source is made. Because AmBe's emission probability extends over this broad range of neutron energies, AmBe, and similar chemical sources such as PuBe, are referred to as broad energy spectra neutron sources.

The inventors have also found that using AmBe as a neutron source is quite economical compared to Cf sources. AmBe sources have a long half-life and are commercially available in the field. Furthermore, by detecting the weight fraction of silicon using prompt capture gamma ray techniques, one can compensate for the resulting increase in silicon reaction.

Figure 3:
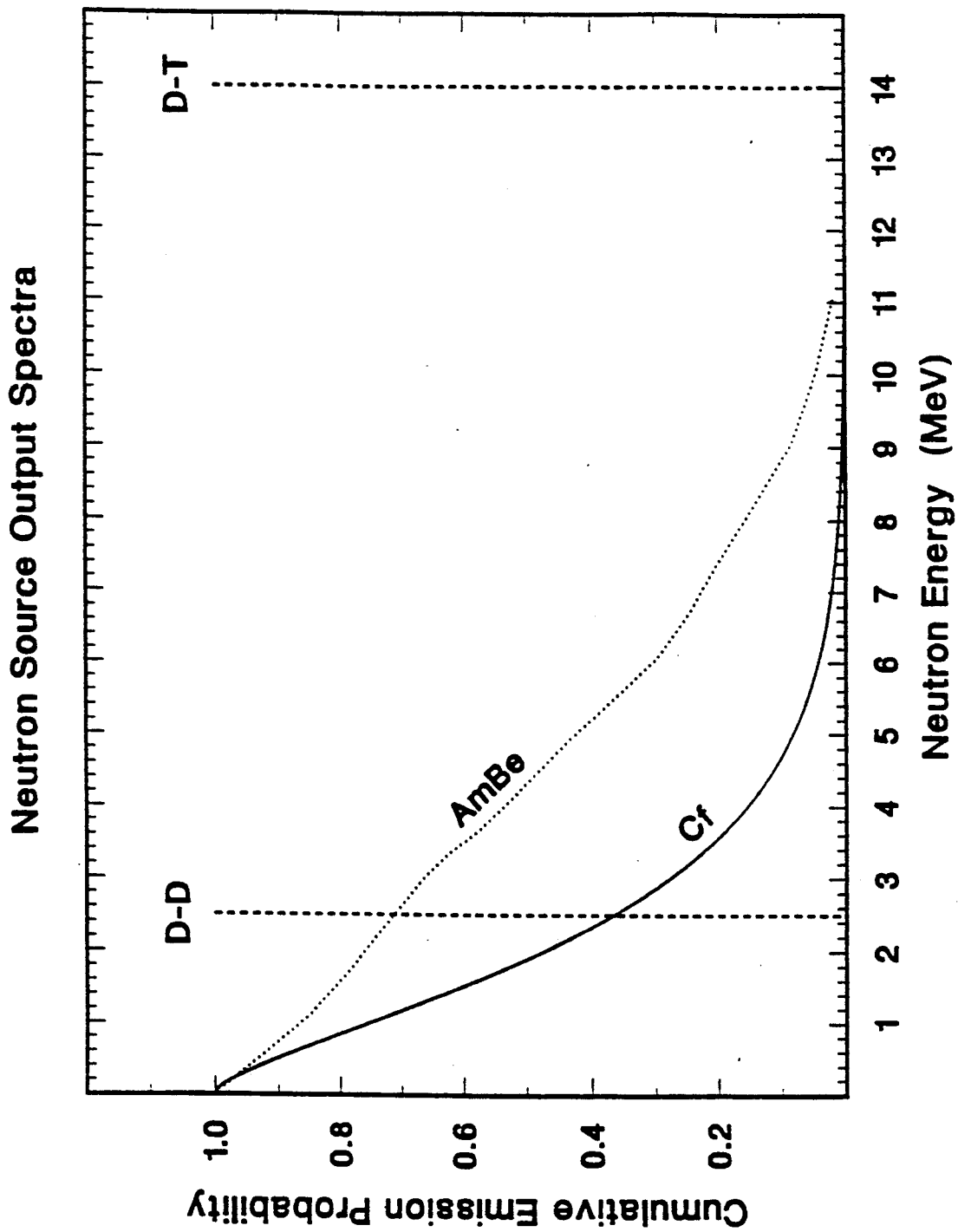

FIG. 3 illustrates neutron source output spectra for four neutron sources. FIG. 3 charts Cumulative Emission Probability as a function of Neutron Energy in MeV. The Cf and AmBe curves of FIG. 3 are the integrals of the corresponding curves of FIG. 2. The cumulative emission probability of Cf is 0.15 (15%) at 4 MeV, indicating that 85% of the Cf output will occur at neutron energy levels below 4 MeV. This has been defined in U.S. Pat. No. 5,021,653 as a low energy neutron source. The cumulative emission probability of AmBe is 0.53 (53%) at 4 MeV, indicating that 47% of the AmBe output will occur at energy levels below 4 MeV. For AmBe, 5% output occurs above neutron energy levels of 10 MeV. Because AmBe requires neutron energy levels that extend to 10 MeV, AmBe is referred to as a broad energy spectra source. Another such source is PuBe, for instance.

Thus, the inventors have found that the neutron source need not be within a narrow range of neutron energy levels, though such sources may be preferred for some applications. Neutron sources having a broad spectra of neutron energies are possible.

Figure 4:
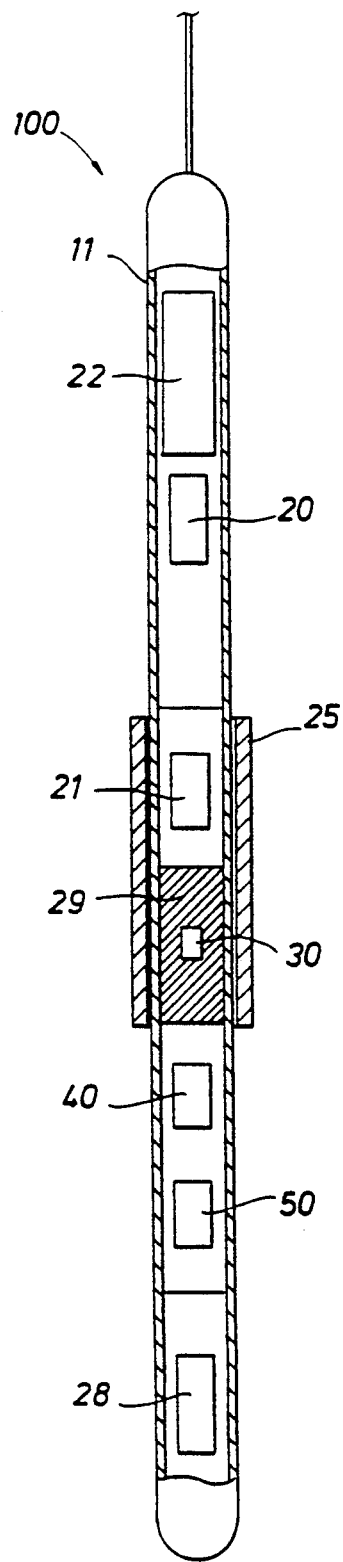
FIG. 4 is a schematic side view of another embodiment of a logging tool according to the invention.

An alternative embodiment of the invention is shown on FIG. 4 where devices similar or identical to those shown on FIG. 1 bear the same reference. The main differences between the tool string 100 on FIG. 4 and the tool string 10 on FIG. 1, are:

the "capture" measurements are carried out with a single detector 21;

below the source 30 are provided two longitudinally spaced neutron detectors 40 and 50, designed to carry out "porosity" measurements from the ratio of the counts of the thermal (or epithermal) neutrons interacting with hydrogen in the formation; the two detectors 40 and 50 and their associated circuitry are known in the art (see e.g. U.S. Pat. Nos. 4,423,323 or 4,816,674 which are here incorporated by reference).

Furthermore, the chemical source allows enough room for disposing two additional neutron detectors for "porosity" measurements. The two additional detectors are not shown and known per se. An electronic source would require a space dedicated to the usual power supply devices, and located in the vicinity of the source itself.

Figure 5:
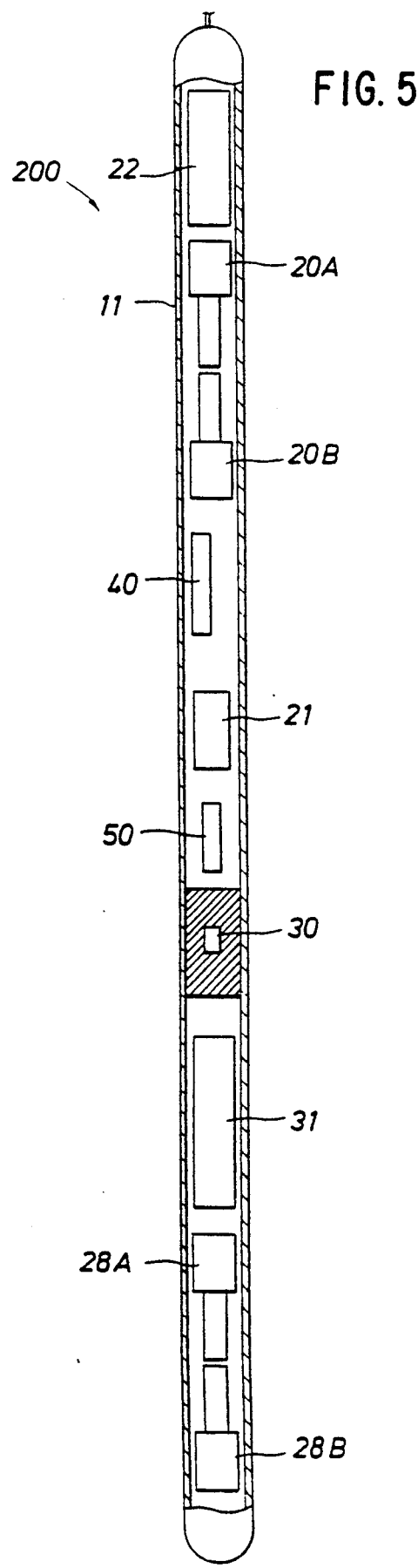
FIG. 5 is a schematic view of a further embodiment of a logging tool according to the invention.

FIG. 5 shows a further alternative embodiment of the form of a tool string 200 where devices similar or identical to those shown on FIG. 1 or FIG. 4 bear the same reference.

The source 30 is, in the embodiment of FIG. 5, a broad energy spectra neutron source such as a PuBe source. The natural gamma ray measurements are carried out through a set of two detectors 20A and 20B, facing each other and operating along with their associate circuitry, e.g. in the manner described in the Assignee's U.S. patent application filed on Aug. 30, 1989 under Ser. No. 07/400,847. Detectors 20A and 20B are identical one to the other and both act as the detector 20 shown in FIG. 1 or FIG. 4. In a like manner, the aluminum activation measurements are carried out by a set of two detectors 28A, 28B. A first neutron detector 40 is disposed between the "capture" detector 21 and the set of natural gamma ray detectors 20A, 20B. A second neutron detector 50 is placed between the "capture" detector 21 and the source 30. Both neutron detectors 40 and 50 are designed, along with their associate circuitry, to measure and calculate porosity, as known in the art and described e.g. in U.S. Pat. No. 4,423,323.

The tool string according to the invention as above described and depicted in any of FIG. 1, FIG. 4 or FIG. 5, contemplates substantial advantages over the tools of the prior art.

Firstly, the length of the tool is substantially reduced. By way of example, the total length of the tool string 10 can be about 20 feet, while the prior art tools are usually about 69 feet long. As a consequence, it is possible to add another detector to the GST tool system, as well as place the GST detectors 21, 23 closer to the source 30; both of these features lead to an improvement of the counting statistics of the "capture" measurements by at least a factor of 3.

Secondly, as a consequence of the better measurements, it is possible to run the tool string at a higher logging speed (such as at least 1200 feet/hour, instead of 300–600 feet/hour in the prior art).

Thirdly, the invention contemplates the use of a broad energy spectra neutron source, in the form of a chemical source. It is generally agreed upon that a chemical source is reliable, relatively less expensive than an electronic neutron source, and allows one to carry measurements on a continuous time basis, thus substantially improving the accuracy.

Fourthly, the energy of the emitted neutrons:

(i) allows the reduction of silicon or oxygen activation which might interfere with Al activation;

(ii) reduces the number of inelastic scattering gamma rays which might interfere with "capture" and "activation" measurements; and (iii) permits placing below the tool string an additional tool designed to measure the density, without any detrimental interference between the gamma rays emitted by the additional "density tool" and the gamma rays resulting from the fast neutron reaction of silicon and oxygen atoms.

Fifthly, since a single source is used for both the "activation" and the "capture" measurements, no environmental correction is needed, such as a borehole correction.

Sixthly, the invention proposes a new interpretation model for the determination of Al content. This model improves the prior art model such as the model disclosed in the SPE paper #16792, already referred to. The model of the invention is based on the "closure model" depicted in this SPE paper, in the sense that the sum of the elemental weight fractions is unity. This is expressed as:

$$F \Sigma_i [X_i (CR_i/S_i)] + X_k \, Wt_k = 1$$

where, using the notation set forth in the SPE paper, "$\Sigma_i$" is a summation operator over the elements "i", "$Wt_i$" is equal to F $(CR_i/S_i)$ and is the weight fraction of the element "i" determined from capture and activation measurements, "F" is a depth dependent normalization factor applied both to activation and capture, "$X_i$" is the ratio of the weight of the associated oxide or carbonate to the weight of the element "i", "$CR_i$" is the total count rate from activation and capture, corrected for dead time and logging speed, and attributed to the element "i", "$S_i$" is a relative spectral sensitivity factor of the element "i". "$X_k$" and "$Wt_k$" correspond to the hereabove definitions except that they are derived from natural activity measurements. According to the invention, Al is included in the weighted sum, i.e. Al is one the elements "i".

The model according to the invention allows one to calibrate of both the capture and the activation gamma rays, and also eliminates the need for an environmental correction algorithm, required by prior art methods, which relies on accurate knowledge of borehole and formation capture cross sections and stand-off conditions of the tool in the borehole.

What is claimed is:

1. A method for identifying and determining the concentrations of subsurface formation elements next to a borehole, including the steps of:

(1) irradiating the formations with neutrons from a broad energy spectra neutron source disposed in a logging tool lowered in the borehole wherein the neutron source is the only source in the logging tool;

(2) detecting and counting the delayed gamma rays resulting from the activation of atoms of at least a first element by the neutrons emitted by said source;

(3) deducing from the counts of activation gamma rays the concentration of said first element;

(4) detecting and counting the prompt gamma rays resulting from the capture of the neutrons emitted by said source by atoms of at least a second element; and (5) deducing from the count rates of capture gamma rays the concentration of said second element.

2. The method according to claim 1 wherein said neutron source is an AmBe source.

3. The method according to claim 1 further including the steps of detecting and counting the gamma rays resulting in count rates from the background natural activity, and subtracting said count rates from the count rates of the activation of atoms of said first element.

4. The method according to claim 1 wherein the step of deducing from the capture gamma rays the concentration of said second element, and the step of deducing from the activation gamma rays the concentration of said first element, are simultaneous.

5. The method according to claim 1 wherein the sum of the oxide and carbonate weight fractions is forced to unity and expressed as:

$$F \Sigma_i [X_i (CR_i/S_i)] + X_k \, Wt_k 1$$

where "$\Sigma_i$" is a summation operator over the elements "i", "$Wt_i$" is equal to $F(CR_i/S_i)$ and is the weight fraction of the element "i" determined from capture and activation measurements, "F" is a depth dependent normalization factor, "$X_i$" is the ratio of the weight of the associated oxide or carbonate to the weight of the corresponding element "i", "$CR_i$" is the total count rate from activation and capture, corrected for dead time and logging speed, and attributed to the corresponding element "i", "$X_k$" and "$Wt_k$" are inferred from natural activity measurements, "$S_i$" is a relative spectral sensitivity factor of the corresponding element "i", and wherein said first element is included in said summation operator $\Sigma$.

6. The method according to claim 1 wherein said step of detecting the capture gamma rays is carried out by two detectors disposed on either side of said broad energy spectra neutron source.

7. The method according to claim 1 further including detecting and counting the gamma rays resulting from the natural activity of atoms of at least a third element.

8. A logging tool for identifying and determining the concentrations of subsurface formation elements next to a borehole, comprising:
 (1) means for irradiating the formations with neutrons from a broad energy spectra neutron source disposed in a logging tool lowered in the borehole wherein the neutron source is the only source in the logging tool;
 (2) means for detecting and means for counting the delayed gamma rays resulting from the activation by the neutrons of atoms of at least a first element;
 (3) means for deducing from the counts of activation gamma rays the concentration of said first element;
 (4) means for detecting and means for counting the prompt gamma rays resulting from the capture of the neutrons emitted by said source by atoms of at least a second element; and
 (5) means for deducing from the count rates of capture gamma rays the concentration of said second element.

9. The tool according to claim 8 wherein said source is a chemical source.

10. The tool according to claim 9 wherein said chemical source is an AmBe source.

11. The tool according to claim 8 further comprising means for detecting and means for counting the gamma rays resulting in count rates from the background natural activity, and means for subtracting said count rates from the count rates of the activation of atoms of said first element.

12. The tool according to claim 8 further comprising means for detecting and means for counting the gamma rays resulting from the capture of neutrons by atoms of a first plurality of elements, and means for deducing from the respective count rates of capture gamma rays relative to each element, the concentration of each element.

13. The tool according to claim 8 further comprising means for detecting and means for counting the gamma rays resulting from the natural activity of atoms of at least a third element.

14. A logging tool for identifying and determining the concentrations of subsurface formation elements next to a borehole, comprising a housing in which are successively disposed, from top to bottom:
 (1) means for detecting and means for counting the gamma rays resulting from the natural activity of atoms of at least one element;
 (2) first means for detecting and means for counting the prompt gamma rays resulting from the capture of neutrons by atoms of at least another element;
 (3) means, in the form of a chemical neutron source, for irradiating the formations with broad energy spectra neutrons wherein the neutron source is the only source in the logging tool;
 (4) second means for detecting and means for counting the prompt gamma rays resulting from the capture of neutrons by atoms of said another element; and
 (5) means for detecting and means for counting the delayed gamma rays resulting from the activation, by the neutrons emitted by said irradiating means, of atoms of at least a further element.

* * * * *